(No Model.)

J. R. ENOS.
REEL FOR CHECK ROWER ROPES.

No. 311,302. Patented Jan. 27, 1885.

Witnesses:—
S. A. Bullard
Joseph L. Craft

Inventor:—
John R. Enos

UNITED STATES PATENT OFFICE.

JOHN R. ENOS, OF BUFFALO HART, ILLINOIS.

REEL FOR CHECK-ROWER ROPES.

SPECIFICATION forming part of Letters Patent No. 311,302, dated January 27, 1885.

Application filed September 13, 1884. (No model.)

*To all whom it may concern:*

Be it known that I, JOHN R. ENOS, a citizen of the United States, residing at Buffalo Hart, in the county of Sangamon, State of Illinois, have invented a new and useful Self-Acting Reel for Winding Check-Rower Ropes and Wires, of which the following is a specification.

My invention relates to check-rower ropes and wires connected with corn-planters for check-row dropping. It consists of a reel for winding up the rope or wire while driving across the field, the reel being turned by cog-gearing connecting with one of the planter-wheels. Another use of the invention is to lay the rope or wire across the field preparatory to planting by driving across the field, the reel being thrown out of gear to allow the rope to unwind. I attain these two objects by the machine illustrated in the accompanying drawings, in which—

Figure 1:
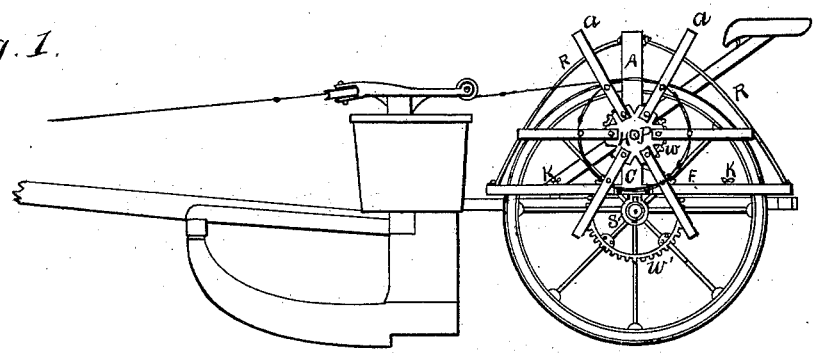
Figure 2:
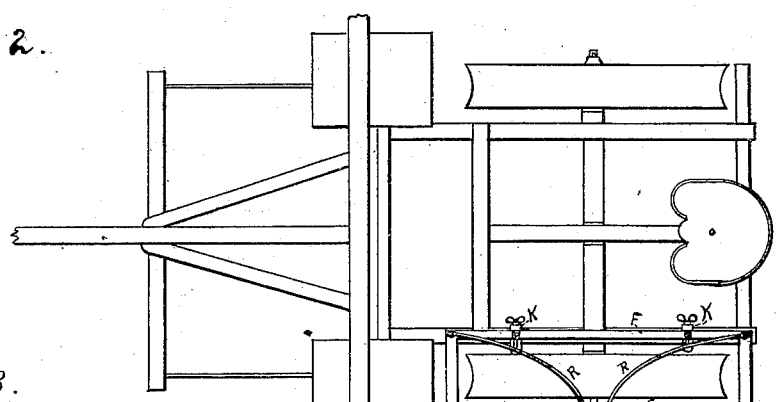
Figure 3:
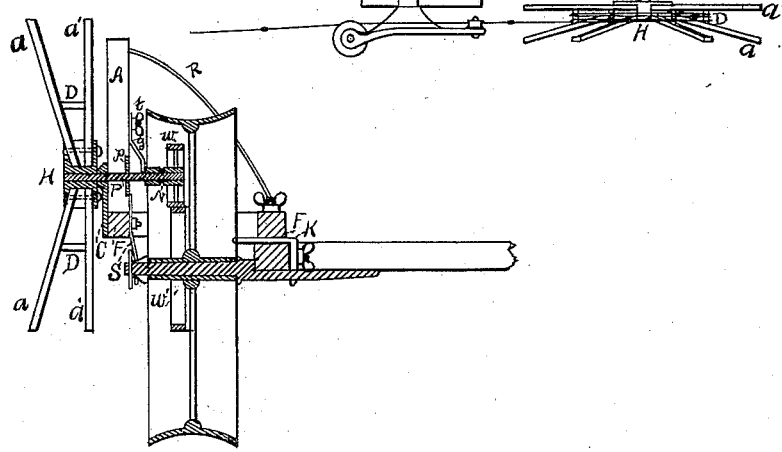

Figure 1 is a side elevation of a corn-planter with a check-rower and the reel attached. Fig. 2 is a top view of the same. Fig. 3 is a vertical cross-section of the wheel of the corn-planter to which the reel is attached, showing the construction of the reel and the way in which it is operated.

Similar letters refer to similar parts throughout each of the figures.

The invention consists of a rectangular frame, of wood, F F, made to set around the planter-wheel and rest on the frame of the planter. Onto the outer side of the frame F F is framed an upright arm, A, on which the reel is supported and operated. The arm A is braced at the top by two brace-rods, R R, which pass over the planter-wheel to the inside corners of the frame F F, to which they are bolted. By means of these rods R R the arm A is held firm and perpendicular to the frame F F. Where the arm A joins the frame F F is an inverted-T-shaped iron casting, C, which adds strength to the arm A. In the upper end of this casting is a hole, through which the pinion P of the reel passes, thus giving a solid bearing for support of the reel, at the same time holding it clear of the arm A. On the inner side of the arm A is a small iron plate, $p$, through which the reel-pinion P also passes, thus giving it a firm and durable bearing on the inside of the arm A.

The reel proper consists of a cast-iron hub, H, fastened to the pinion P, which passes through the arm A, and the irons C and $p$, having a cog-wheel, $w$, on the opposite end. Into the hub H are fastened the wooden reel-arms $a$ and $a'$, as shown in the drawings, each pair of arms being connected with a turned cross-piece, D, of wood, which forms the bearing on which the rope or wire is wound. The cog-wheel $w$ fits loosely on the pinion P, in order that it may be slipped to the right or left to throw the reel in or out of gear with the cog-wheel $w'$, attached to the spokes of the planter-wheel. The wheel $w$ is held in or out of gear with the cog-wheel $w'$ by means of gear-iron $g$, which is slotted at the upper end, and is raised or lowered by means of the thumb-screw $t$. The reel is thrown out of gear by raising the gear-iron $g$ and slipping the cog-wheel $w$ toward the arm A until the gearing-iron $g$ can be lowered into the notch N in the hub of the wheel $w$, which holds it clear of the wheel $w'$. The reel-frame is attached to and held in place on the planter, as shown in the drawings, by means of the L-shaped irons K K, fastened to the frame of the planter. Both arms of the irons K K are slotted, so the reel-frame may be raised or lowered or slipped to the right or left to properly adjust the gearing. The outer side of the frame F is supported by an iron stirrup, S, bolted to the inner side of the frame F and the arm A, the lower end of the iron S being made to fit on the axle of the planter-wheel. The upper end of S is slotted, so the reel-frame may be raised or lowered to correspond with the supports K K.

The whole invention is so constructed that it may be operated over either wheel of the corn-planter and may be attached to any corn-planter. When in gear, the reel turns in an opposite direction from the planter-wheel, thus causing the rope or wire to run on the upper side, as shown in Fig. 1, the rope or wire being taken off the ground by the pulleys of the check-rower, which act as a guide for the rope or wire to the reel, causing it to be wound on evenly and smoothly. The reel is thrown out of gear when driving to or from the field and when laying the rope or wire preparatory for planting.

While planting the reel can be taken from the planter and turned over so as to rest on the brace-rods R R, which hold the reel clear of the ground, allowing the rope or wire to be unwound as needed when planting.

I am aware that a self-winding reel for check-row lines has been used for the same purpose as my invention, and that a patent therefor was granted to Geo. D. Haworth, May 8, 1883, No. 277,030; but my invention is an improvement over his, and will do work that his cannot do. I therefore do not claim my invention, broadly; but What I do claim, and desire to secure by Letters Patent, is—

1. The frame F F, the arm A, the rods R R, the slotted irons K K, the casting C, and the stirrup S, as and for the purposes described.

2. The reel proper, consisting of the hub H, with the arms $a$ $a'$, and the piece D, with the pinion-shaft P, the gear-iron $g$, and the wheel $w$, combined and arranged as shown and described, for the purposes specified.

JOHN R. ENOS.

Witnesses:
S. A. BULLARD,
JOSEPH L. CRAFT.